United States Patent

[11] 3,593,137

| [72] | Inventor | Robert F. Wall<br>Chesterfield, Mo. |
|---|---|---|
| [21] | Appl. No. | 761,607 |
| [22] | Filed | Sept. 23, 1968 |
| [45] | Patented | July 13, 1971 |
| [73] | Assignee | Monsanto Company<br>Saint Louis, Mo. |

[54] PROCESS CONTROL INSTRUMENT INCLUDING ROTATABLE INDICIA CARRYING MEMBER FOR CHANGING ELECTRICAL OUTPUT SIGNALS
4 Claims, 4 Drawing Figs.

| [52] | U.S. Cl. | 324/157 |
| [51] | Int. Cl. | G01r 1/00 |
| [50] | Field of Search | 317/104- |
| | —111; 338/135, 196; 324/114, 156, 98, 99, 157, 115; 73/359 | |

[56] References Cited
UNITED STATES PATENTS

| 2,387,466 | 10/1945 | Ratet | 324/114 X |
| 3,361,968 | 1/1968 | Sohow | 324/114 |
| 1,593,626 | 7/1926 | Foote | 324/98 |
| 1,791,563 | 2/1931 | Horn | 75/359 X |
| 2,885,639 | 5/1959 | Tewksbury | 324/115 |

*Primary Examiner*—Alfred E. Smith
*Attorneys*—J. D. Upham, J. D. Kennedy and Harold R. Patton ABSTRACT: A display and control instrument consisting of a housing member in which an annular wheellike indicia-carrying member is rotatably mounted. The indicia-carrying wheel member includes leaf contacts which are arranged to be slidably rotated in contact with potentiometer means rigidly secured to the instrument housing member. A plurality of meter movements are coaxially mounted within the housing member such that their pointers or indicators are freely movable in arcuate paths in close proximity to a scale located on the indicia-carrying member.

PATENTED JUL 13 1971

INVENTOR
ROBERT F. WALL

BY Harold J. Fulton

ATTORNEY

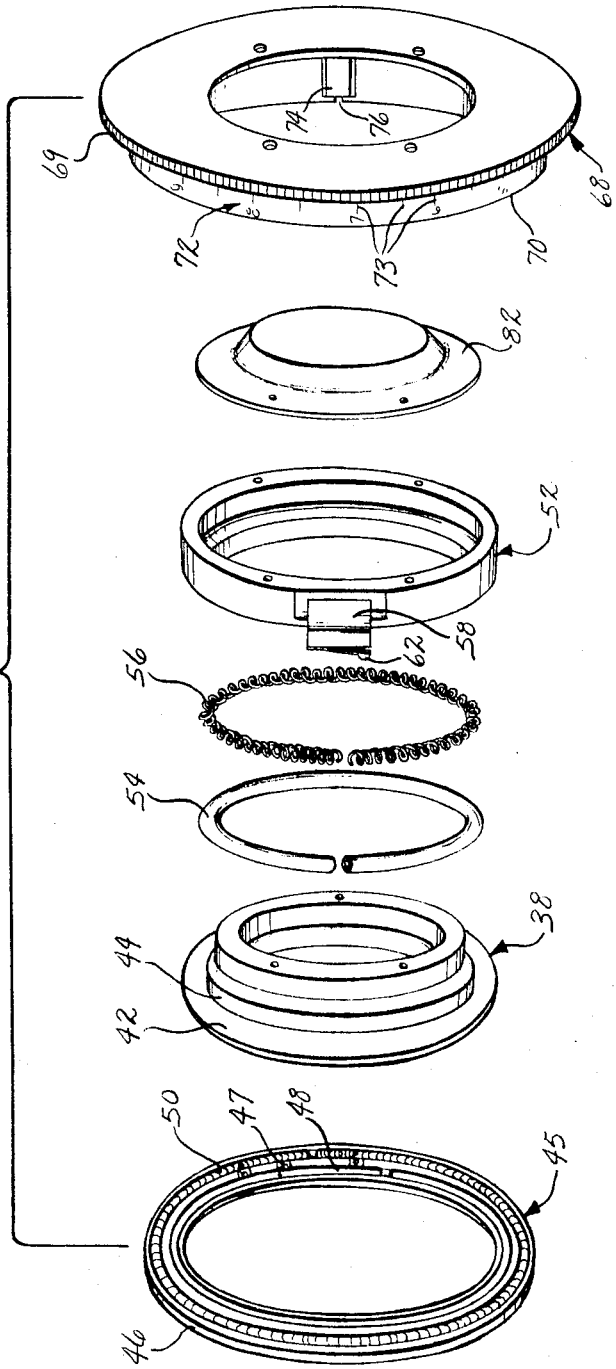

PROCESS CONTROL INSTRUMENT INCLUDING ROTATABLE INDICIA CARRYING MEMBER FOR CHANGING ELECTRICAL OUTPUT SIGNALS

FIELD OF THE INVENTION

The present invention relates generally to instrumentation for process control applications, and more particularly, to a compact display and control instrument for displaying a plurality of conditions, and wherein control adjustment may be made accurately, yet simply.

DESCRIPTION OF THE PRIOR ART

Conventional electronic controllers used to monitor process control systems; for example, chemical processes, employ meters, including scales or indicia, which indicate to an operator the instantaneous status of the conditions being monitored thereby. These controllers usually include a potentiometer associated with a manually operable dial or knob by which an operator may adjust the input voltage to the electronic comparison and signal generating circuitry of the controller, thereby to generate an electronic signal which, in turn, is used to make an adjustment in the condition being monitored and indicated by the controller. In many prior art controllers, the manually operated knob or dial for initiating the change in the process condition is small in comparison with the size of the scale or indicia used to indicate the condition being monitored. Therefore, it is general practice to employ a set of gears between the manually operated knob and the scale or indicia, so that the scale is mechanically positioned to correspond to the electronical adjustment initiated by means of the potentiometer.

In practice it has been found that the set of gears or other such mechanical apparatus interconnecting the potentiometer knob and the controller scale becomes worn with time or misaligned with use. Therefore, frequent maintenance and recalibration is required. Furthermore, such gear sets or other mechanical apparatus occupy a significant amount of space within controllers of the prior art type and add considerably to the required assembly and maintenance time.

The general purpose of this invention is to provide a combination display and control instrument which embraces all of the advantages of heretofore employed control instruments, yet does not possess the aforedescribed disadvantages or problems. To attain this, the present invention utilizes a unique, rotatable indicia-carrying member having a potentiometer wiper arm arranged to make sliding contact with a potentiometer in response to rotation of the rotatable member.

Therefore, among the objects of the present invention, is the provision of a novel combination display and control instrument having a minimum of moving mechanical parts.

Another object is to provide a combination display and control instrument having an arrangement of mechanical parts such that a compact instrument is achieved.

Still another object is a display and control instrument having mechanical parts arranged for facile assembly and disassembly.

Yet another object of the present invention is the provision of a combination display and control instrument for displaying a plurality of conditions and which may be positively and readily adjusted by an operator to generate electrical signals for changing the conditions being monitored.

SUMMARY OF THE INVENTION

These objects (as well as others apparent herein) are achieved generally by providing a housing member having a generally annular recess. An indicia-carrying member is rotatably mounted within the recess of the housing member along with a potentiometer which is rigidly secured within the housing member recess. A potentiometer wiper arm is secured to the rotatable indicia-carrying member and is arranged to make electrical contact with the potentiometer. By means of this arrangement, rotation of the indicia-carrying member within the housing recess results in a corresponding rotation of the point of contact of the potentiometer wiper arm with the potentiometer.

Both the potentiometer and the indicia-carrying member are generally annular in shape and positioned outwardly of meter movements which are mounted coaxially within the housing recess. The indicators associated with each meter movement are positioned in such a manner as to provide unobstructed movement about the potentiometer and indicia-carrying member. The movement of the indicators is in relation to a scale mounted on the indicia-carrying member and is readily visible through a transparent window positioned along the periphery of the housing member.

BRIEF DESCRIPTION OF THE DRAWINGS

Utilization of the present invention will be apparent from the following description of a preferred embodiment, as illustrated in the accompanying drawings, in which:

FIG. 4 is an exploded view of the component parts of the combination display and control instrument of the present invention.

BACKGROUND OF THE INVENTION

Figure 1:
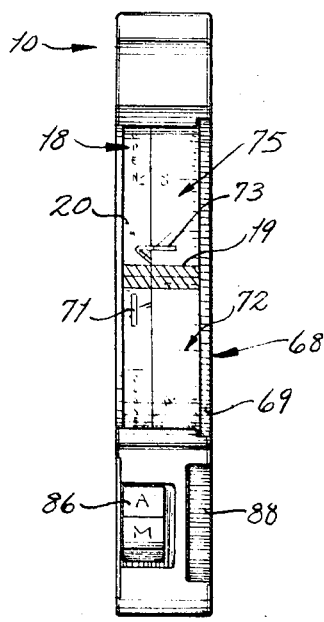
FIG. 1 is a front view of the combination display and control instrument of a preferred embodiment of the present invention.
Figure 2:
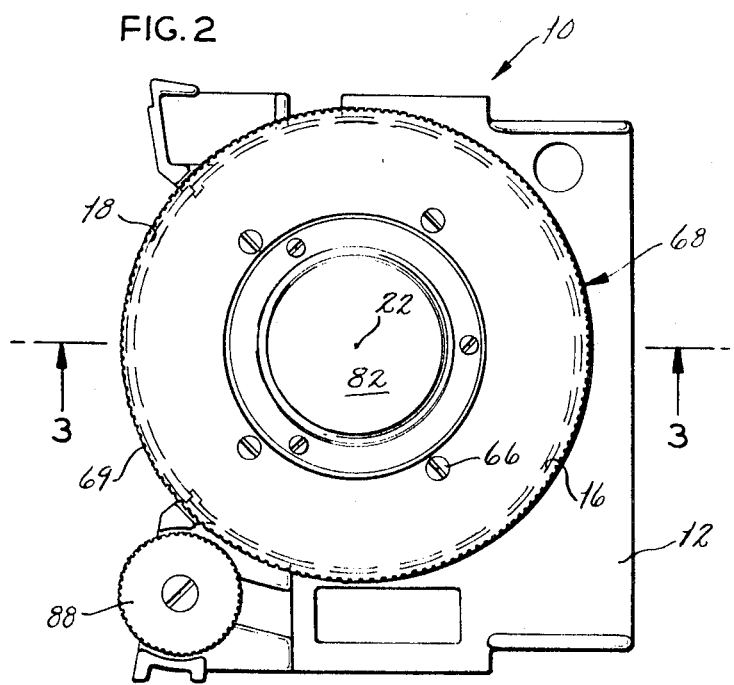
FIG. 2 is a side view of the instrument of FIG. 1.

Briefly, a typical process control system electrically varies the input to a mechanical, electrical, or chemical system, detects the output of that system (called the process variable), transduces the output signal into an electrical signal, and generates an electrical input signal corresponding to the difference between the detected process variable and a desired process variable (known at the set point). To illustrate by means of a specific example, the electrical signal from a control instrument to a fluid flow control system may control the extent to which a valve is opened, the process variable being the rate of flow of a fluid through a pipe which is partially restricted by means of the valve. The rate of flow is detected by the conventional detector and converted into an electrical signal proportional thereto; the electrical signal then being compared at the instrument with another electrical signal which is proportional to the desired rate of flow (the set point).

The control instrument referred to hereinabove indicates the desired set point value, the actual process variable detected, and the actual valve position of the valve. Such an instrument further includes analog control circuits which compare the set point and process variable signals to generate therefrom an output signal, which signal in turn adjusts the control element, for example the degree of opening of a valve, to cause the desired rate of flow to occur in the pipe or other process variable. Oftentimes such instruments are referred to as "controllers" or "electronic controllers."

A typical manufacturing plant may contain hundreds of individual control loops, each having a controller associated therewith as described hereinabove. The smaller the space occupied by each controller, the more compact a control room may be and the easier it is for an operator monitoring all of the processes to quickly detect any errors occuring within any individual control loop.

The display and control instrument or controller to be described hereinafter serves to monitor control systems of the type just described; that is, the process variable and status of the control element are displayed along with the desired set point. The instrument further provides means for directly adjusting the set point signal, thereby to control the output signal which is applied to the control element, for example, the valve, or some other apparatus within the control system.

DESCRIPTION OF PREFERRED EMBODIMENTS

Referring now to the drawings, wherein like reference characters designate like or corresponding parts throughout the several views, there is shown a combination display and control instrument, generally designated 10. The instrument 10 includes a housing member 12, which may take the form of an aluminum die casting having a generally annular recess portion 14 delimited by a generally annular rim 16. A portion of the annular rim 16 takes the form of a transparent window 18 having a set point indicator 19 and a valve-position scale or indicia 20 etched or painted thereon. The annular rim 16 of the housing member 12 is generally circular in form and defines the meter movement axis of the control instrument 10 as designated at the numeral 22.

Mounted to the housing member 12 by means of threaded studs 24 and threaded nuts 26 are two meter movements 28 and 30. These meter movements are of the conventional type; that is, they include a curved permanent magnet portion, 27 and 29 respectively, about which coils 31 and 33 are pivoted. The coils 31 and 33 are formed together with needlelike indicators 35 and 37 and both are pivoted about the meter movement axis 22 of the instrument 10. The meter movement 28 is associated with the valve-position signal which is received at contact terminals 32, while the meter movement 30 is associated with the process-variable signal received at meter movement terminals 34.

As is the conventional operation of the type of meter movements shown, the signals to which the meter movements 28 and 30 are responsive are directed to their respective coils. These signals result in a deflection of the indicators 35 and 37 associated with the respective meter movement, the degree of deflecting corresponding to the magnitude of the applied signals. Thus, an operator may readily monitor the instantaneous condition of the valve position and the process variables by observing the position of the indicators associated with the meter movements 28 and 30, respectively.

In order to prevent any interaction between the two coaxially mounter meter movements 28 and 30, a magnetic shield 36 may be inserted between the two meter movements to prevent the magnetic fields from either meter movement interfering with the proper operation of the other meter movement. In the alternative commercially available self-shielded meters may be employed.

Spaced outwardly from the meter-movement axis 22 and meter movements 28 and 30, there is provided an annular bearing member 38 which, for example, may be a brass, powdered metal or sheet steel member. The annular bearing member 38 is secured to the instrument housing member 12 by means of screws 40 threaded through flange portion 42 of the bearing member 38. The bearing surface of the bearing member 38 extends in the axial direction of the display and control instrument 10 and is designated by the numeral 44.

Arranged concentrically with the annular bearing member 38 and secured rigidly to the housing member 12 is a potentiometer assembly 45 including a base ring or plate 46. Secured in grooves within the potentiometer base plate 46 are spaced apart electrical elements 48 and 50. The potentiometer ring or base plate 46 is an insulator material, while the electrical element 48 takes the form of a large gauge nichrome wire which serves as a collector ring of the potentiometer assembly 45. It should be noted that the ends of the electrical element 48 are electrically insulated from each other and that a contact terminal is connected to it as indicated at 47. The electrical element 50 takes the form of a wound nichrome wire having a predetermined resistance for a given length and serves as the resistive element of the potentiometer assembly 45.

A rotatable annular ring member 52 is provided between the bearing member 38 and the potentiometer assembly 45. The annular ring member 52 may also take the form of a brass or sheet steel member and has its inner surface coupled to the bearing surface 44 of the bearing member 38 by means of a Teflon ring 54. The Teflon ring 54 serves to establish the proper frictional engagement between the inner surface of the ring member 52 and the bearing surface of the bearing member 38. A springlike element 56 may be also inserted between the bearing member 38 and the ring member 52 for the purpose of resiliently urging the Teflon ring 54 against the surfaces of the bearing member 38 and ring member 52. It should be noted that, if machine tolerances are closely controlled, the Teflon ring 54 and spring-line element 56 may be eliminated, and the bearing member 38 allowed to directly engage the ring member 52.

Along the outer surface of the annular ring member 52 there is provided a mounting plate 58 having secured to its surface adjacent to the potentiometer assembly 45 a pair of interconnected conductive wiper contacts 60 and 62. The wiper contact 60 is positioned to slidably engage the electrical element 48 of the potentiometer assembly 35, and the wiper contact 62 is arranged to slidably engage the resistive electrical element 50 of the potentiometer assembly 45.

It should be noted that the potentiometer assembly 45, the bearing member 38, and ring member 52 are all mounted within the recess portion 14 of the housing member 12, such that an opening 64 is provided between the housing member 12 and the potentiometer assembly 45. It is through this opening that the indicators 35 and 37 of the meter movements 28 and 30 pass and move in an unobstructed manner along their arcuate paths. Thus the coaxial mounting of the meter movements 28 and 30 within the housing member 12 together with the concentric arrangement of the potentiometer assembly 35 provide a compact instrument whose width dimension is limited essentially to the combined width of the coaxially mounted meter movements 28 and 30.

Secured to the rotatable ring member 52 by means of screws 66 is a set point wheel 68. The set point wheel 68 is generally ringlike in form and has a knurled peripheral edge surface 69 which may be engaged by the thumb or finger of an operator for ready rotation. A circular flange portion 70 of the set point wheel 68 extends inwardly between the potentiometer assembly 45 and the pointers 71 and 73 of the indicators 35 and 37 of the meter movements 28 and 30. A removable scale 72 is positioned along the flange portion 70 so that indicia 75 printed thereon is presented toward the pointers 71 and 73 and may be viewed through the transparent window 18.

The removable scale 72 is held in position along the flange portion 70 of the set point wheel 68 by means of a tab 74 which may be inserted in a slot 76 provided in the flange portion 70.

Figure 3:
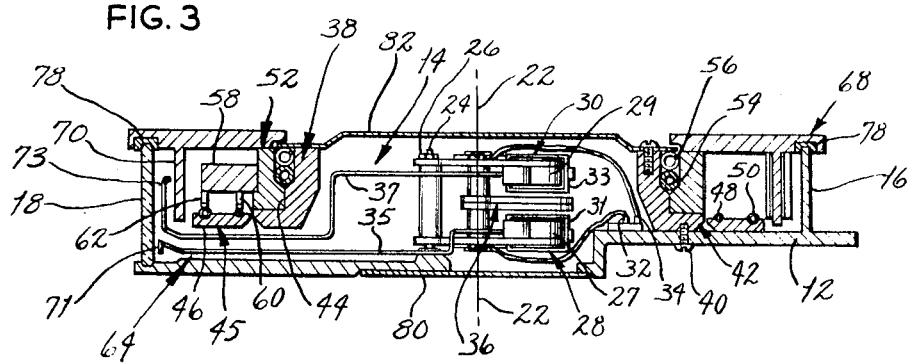
FIG. 3 is a cross-sectional view of the instrument of FIG. 1 taken along the line 3-3 of FIG. 2.

As may be best seen in FIG. 3, a dust seal 78 is provided between the transparent window 18 and the set point wheel 68.

Magnetic shields 80 and 82 are secured to the housing member 12 and the set point wheel 68 to close the sides of the display and control instrument 10, thereby to prevent any dust or other foreign matter from entering the housing member 12.

In operation, the set point of the process being monitored may be readily set by the operator by means of the set point wheel 68. The operator merely engages the knurled peripheral edge surface 69 of the set point wheel 68 and rotates it to a position where the indicia 73 on the scale 72 corresponding to the desired set point value is in alignment with the set point indicator 19 on the transparent window 18. The rotation of the set point wheel 68 and the ring member 52 causes the wiper contacts 60 and 62 to be slidably moved along the electrical elements 48 and 50 of the potentiometer assembly 45. The resistive electrical element 50 has its respective ends connected to a power supply means (not shown), so that a voltage signal corresponding to the desired set point is coupled by means of the other electrical element 48 and its contact terminal to the electronic circuitry (not shown) of the instrument 10.

The voltage signal is then processed by the electronic circuitry of the instrument to generate the control signal which is applied to the valve or other control element in the process. The control element is thereby adjusted to correspond to the desired set point and, if normal conditions prevail, the detector used to sense the process variable provides a corresponding electrical signal to the meter movement 30. The indicating pointer of the meter movement 30 will then move into alignment with the set point indicator 19. The valve position (or the condition of any other control element which might be used in the process) is sensed by means of a detector (not shown) and the resulting electrical signal applied to the meter movement 28 by means of the contact terminal 32. This results in an indication by its associated pointer 71 corresponding to the instantaneous condition of the valve position. The indicia corresponding to the condition of the valve or other control element is shown as the graduated scale 20 at the left edge of the transparent window 18, as viewed in FIG. 1.

If there is an abnormal or upsetting condition occurring within the process, the indicator pointer 73 corresponding to the value of the process variable will move out of its alignment position with the set point indicator 19. This indicates to the controller that the system is not in its proper condition, and he can immediately take steps to correct the situation and bring the process variable indicator back into alignment with the set point indicator. This may be accomplished by means of switching the controller circuitry (not shown) into its manual mode of operation by means of a switch 86 and adjusting the condition of the control element in the process by means of a pulse wheel 88. Inasmuch as the switch 86 and pulse wheel 88 do not form a part of the present invention, they are not described in detail.

In summary, the display and control instrument 10 has the advantages of providing a compact arrangement of component parts which can be readily assembled and disassembled. In addition positive, accurate adjustment of the set point control is provided by means of the set point wheel 68 in combination with the potentiometer assembly 45.

It may be seen that many modifications and variations are possible in the light of the above teachings. Therefore, it is to be understood that the invention may be practiced other than as specifically described.

I claim:

1. A combination display and control instrument, comprising
   a housing member defining a recess substantially circular in shape and including a transparent window,
   a substantially annular indicia-carrying member rotatably mounted to said housing member within said recess and having a portion thereof accessible for direct rotation by an operator, thereby to be readily rotated in close proximity to said transparent window,
   annular potentiometer means fixedly secured to said housing member within said recess,
   potentiometer wiper arm means attached to said indicia-carrying member and positioned to make contact with said annular potentiometer means,
   at least one meter movement mounted within said housing member recess, said meter movement having a pointer movable in an arcuate path in response to the application of electrical signal thereto,
   said potentiometer means and said indicia-carrying wheel being mounted within said housing member to permit said pointer of said meter movement to move unobstructed in its arcuate path in close proximity to said transparent window.

2. The display and control instrument as defined in claim 1, wherein
   said indicia-carrying means includes an annular flange member, together with
   a tapelike scale including indicia thereon removably secured to said flange member.

3. A combination display and control instrument, comprising
   a housing member including a recess and a transparent window forming a portion thereof,
   an indicia-carrying wheel rotatably mounted to said housing within said recess and in close proximity to said transparent window, said indicia-carrying wheel including a portion thereof directly accessible such that an operator may rotate said wheel,
   potentiometer means secured to said housing member within said recess, and
   potentiometer wiper arm means mounted to said indicia-carrying wheel and arranged to make contact with said potentiometer means,
   together with
   a plurality of meter movements mounted coaxially within said housing member recess, said meter movements each having pointers movable in arcuate paths in response to the application of electrical signals to the respective meter movements,
   the potentiometer means and indicia-carrying wheel being mounted within said housing member to permit said pointers to move unobstructed in their arcuate paths in close proximity to said transparent window.

4. A combination display and control instrument, comprising
   a housing member defining a recess and including a curved transparent window as a portion thereof,
   a plurality of meter movements pivotably mounted within said housing member recess along a common axis, said meter movements including pointers adapted to be moved along arcuate paths in response to electrical signals applied to their respective meter movements,
   an annular indicia-carrying member rotatably mounted within said housing member recess concentrically to said pivot axis of said plurality of meter movements, said indicia-carrying member including a portion thereof directly accessible for rotation by an operator,
   annular potentiometer means fixed to said housing member within said recess,
   said potentiometer means fixed to said housing member within said recess,
   said potentiometer means and said indicia-carrying member being spaced within said housing member recess so as to permit one end of said meter movement pointers to pass in an arcuate path in close proximity to and between said transparent window and said indicia-carrying member, and
   potentiometer wiper arm means mounted on said indicia-carrying member in position to make contact with said potentiometer means.